United States Patent [19]

Stahura et al.

[11] Patent Number: 4,551,630

[45] Date of Patent: Nov. 5, 1985

[54] ELECTRIC STARTING SYSTEM

[75] Inventors: Daniel W. Stahura, Anderson; Daniel D. Richey, New Castle, both of Ind.

[73] Assignee: General Motors Corporation, Detroit, Mich.

[21] Appl. No.: 615,799

[22] Filed: May 31, 1984

[51] Int. Cl.[4] .............................................. H02P 9/04

[52] U.S. Cl. .............................. 290/38 R; 290/38 A; 290/38 B; 290/38 E; 123/179 B

[58] Field of Search ................. 290/38 R, 38 A, 38 B, 290/38 C, 38 D, 38 E, DIG. 1, DIG. 3, DIG. 4, DIG. 6, DIG. 11, 37 R, 50; 123/179 B; 74/7 R, 7 A

[56] References Cited

U.S. PATENT DOCUMENTS

| | | | |
|---|---|---|---|
| 3,433,968 | 3/1969 | Broyden | 290/37 R |
| 3,609,383 | 9/1971 | Welsh | 290/38 R |
| 3,668,411 | 6/1972 | Leger | 290/38 |
| 3,836,788 | 9/1974 | Carlson et al. | 290/38 X |
| 3,866,960 | 2/1975 | Chohan | 290/38 |
| 4,305,002 | 12/1981 | Mortensen | 290/38 R |
| 4,415,812 | 11/1983 | Griffith et al. | 290/38 C X |
| 4,418,289 | 11/1983 | Mortensen | 290/38 R X |

*Primary Examiner*—William M. Shoop, Jr.
*Assistant Examiner*—Shik Luen Paul Ip
*Attorney, Agent, or Firm*—C. R. Meland

[57] ABSTRACT

An electric starting system for cranking an internal combustion engine that utilizes a starter having a solenoid that is provided with pull-in and hold-in coils. The solenoid includes a plunger which when shifted operates solenoid switch contacts and shifts a pinion into mesh with the ring gear of the engine to be cranked. The electric starting motor has series and shunt field coils and during cranking operation the shunt field is energized through the hold-in coil of the solenoid and the series field is energized through the pull-in coil of the solenoid. This mode of energization produces a small indexing torque that slowly rotates the pinion when end tooth abutment occurs between the pinion and the ring gear.

4 Claims, 1 Drawing Figure

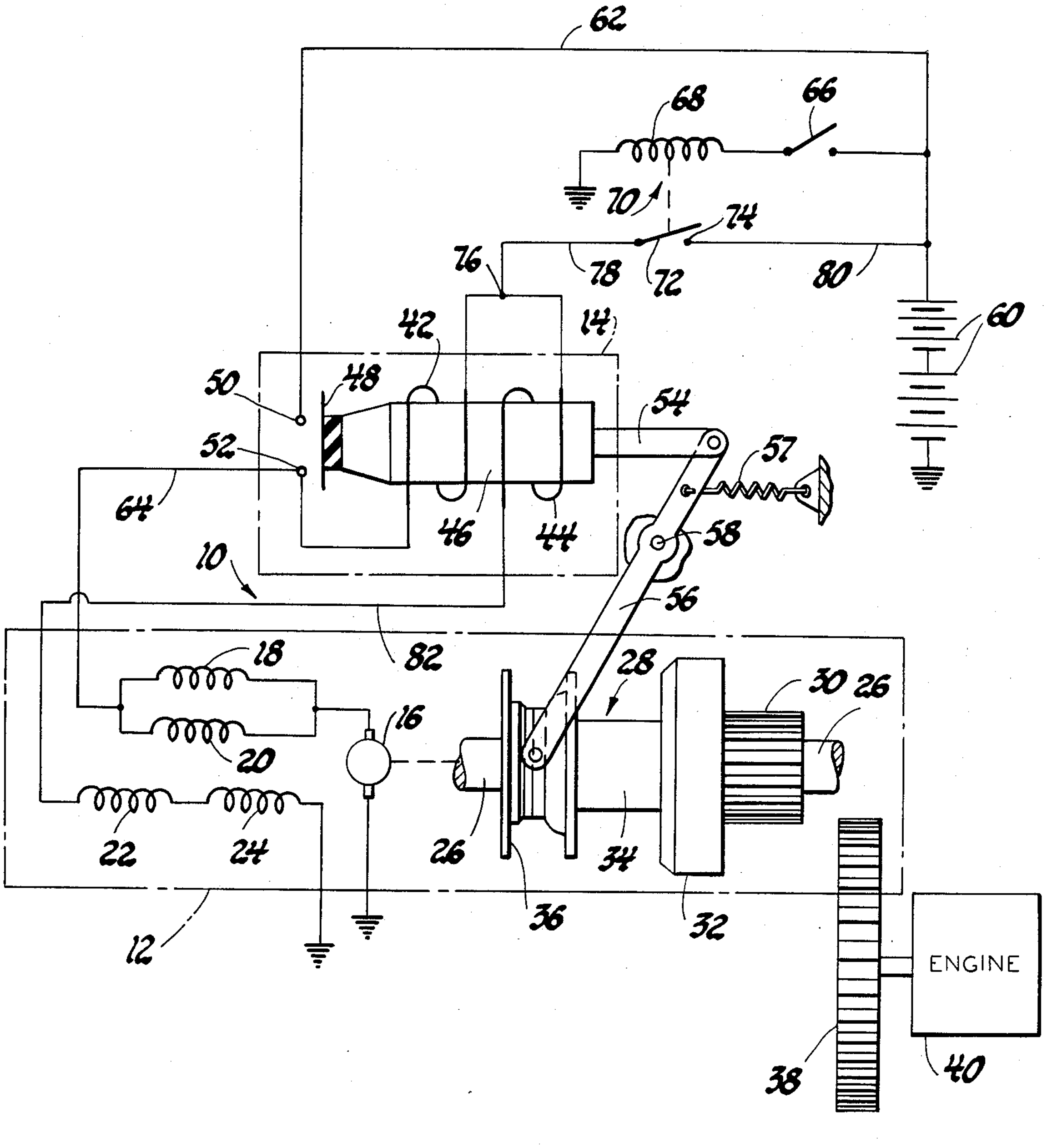
62
68
66
70
74
76
78
72
80
60
42
14
50
48
54
52
57
64
46
44
58
10
56
82
18
28
30
26
16
20
22
24
26
34
36
32
12
ENGINE
38
40

ELECTRIC STARTING SYSTEM

This invention relates to an electric starting system for cranking an internal combustion engine.

One known type of electric starter, for cranking an internal combustion engine, utilizes a solenoid that has a plunger which is connected to a pinion by a shift lever. When the coils of the solenoid are energized the plunger is shifted to cause the pinion to mesh with the ring gear of the engine and movement of the plunger also causes a shiftable contactor to engage fixed contacts of a solenoid switch to energize the electric cranking motor and thereby rotatably drive the pinion.

When the pinion of the starting apparatus is moved toward a meshed condition with the ring gear it is possible for the end of the teeth of the pinion to abut or engage the end of the teeth of the ring gear (end tooth abutment) to prevent meshing of the pinion with the ring gear. In certain types of starting apparatus a so-called jump spring is utilized which is located between a starter drive shift collar and the pinion. The spring is compressed when end tooth abutment occurs and the compression of the spring allows the solenoid plunger to move the solenoid contactor into engagement with the fixed contacts of the solenoid to thereby energize the cranking motor to in turn cause rotation of the motor armature and pinion driven thereby. If the pinion is not rotated too fast the compressed spring forces the pinion into mesh with the ring gear. However, if the pinion is rotated too fast, the pinion may not properly mesh with the ring gear thereby causing damage to the teeth of the pinion and/or ring gear. Thus, when a heavy duty cranking motor of the 24 volt type is used the starting torque of the motor could be so great that if end tooth abutment occurred the energization of the cranking motor would cause the pinion to rotate without properly meshing with the ring gear with consequent tooth damage.

The prior art has recognized the end tooth abutment problem and one solution to it is disclosed in the U.S. Pat. No. 2,862,391, to Schneider et al. In that patent the starter drive has a stop member which prevents the solenoid switch from closing to thereby prevent energizing the starter motor when end tooth abutment occurs. The starter drive of this patent also has a sleeve that has an external helical spline that engages a complementary internal splined portion of the pinion. When end tooth abutment occurs the sleeve moves axially relative to the pinion and due to the splined connection the pinion is rotated slightly.

Another solution to the end tooth abutment problem is disclosed in the U.S. Pat. No. 2,542,712, to Schneider et al. In that patent initial movement of the solenoid plunger or armature actuates a switch to connect the cranking motor to the voltage source through a resistor. This causes a slow rotation of the pinion prior to the time it engages the ring gear. When the pinion does mesh with the ring gear the cranking motor is energized through another switch to apply full source voltage to the cranking motor.

Another arrangement for causing initial slow rotation of the armature of a cranking motor is disclosed in the U.S. Pat. No. 1,414,653, to Kratz. In that patent a high resistance field coil is energized through a circuit that includes a switch, a magnet coil and the armature of the motor. Energization of the field coil causes the armature and a pinion connected thereto to shift axially while at the same time causing a slow rotation of the armature and pinion. When the pinion meshes with the ring gear additional switch contacts are closed to connect another field winding in series with the motor armature.

Still another system for providing initial slow rotation of the motor armature, in an arrangement wherein the motor armature is shifted axially by energization of a field winding to axially shift a pinion connected to the armature into mesh with a ring gear, is disclosed in the U.S. Pat. No. 2,521,024, to Saives. In that patent the cranking motor has a shunt field and a series field. When the system is conditioned to initiate cranking the shunt field winding is energized and the series field winding and armature are energized through a resistor. When the armature shifts axially by an amount sufficient to cause meshing of the pinion with the ring gear the resistor is short circuited thereby applying full power to the motor.

In contrast to the prior art systems that have been described, it is an object of this invention to provide a starting system that is capable of slowly rotating the pinion of the starter when end tooth abutment occurs that does not utilize a resistor for initially reducing the power applied to the motor, does not require a splined sleeve of the type disclosed in the above-referenced Schneider et al. U.S. Pat. No. 2,862,391 and does not shift the armature of the motor axially to effect shiftable movement of the pinion into mesh with the ring gear. Thus, a starting system made in accordance with this invention utilizes a solenoid having pull-in and hold-in coils for shifting an armature or plunger that in turn shifts a pinion into mesh with the ring gear. The plunger also actuates a solenoid switch to close the contacts of the switch to energize the cranking motor when the pinion is fully meshed with the ring gear and the starter drive is arranged such that the solenoid switch contacts cannot be closed until the pinion is fully meshed with the ring gear. The electric starting motor has a series field and a shunt field. When a manually operable start switch is closed the hold-in and pull-in coils are both energized. The hold-in coil is energized through the shunt field of the motor and the pull-in coil is energized through the series field and armature winding of the motor. If end tooth abutment occurs the armature of the motor is slowly rotated to thereby slowly rotate the pinion since a small motor torque is developed as a result of the energization of the shunt and series fields and the armature winding. When the pinion properly aligns itself with the ring gear the force developed by solenoid coils meshes the pinion with the ring gear and the solenoid switch contacts close. The closure of the solenoid switch contacts short circuits the pull-in coil and the motor thus operates at full power and torque as a compound motor with the shunt field energized through the hold-in coil and with the series field and motor armature connected directly across the voltage source.

IN THE DRAWINGS

The single FIGURE drawing illustrates an electric starting system made in accordance with this invention.

Referring now to the drawing, the reference numeral 10 generally designates an electric starter which has a 24 volt direct voltage starting or cranking motor 12 and a solenoid 14. The solenoid 14 is secured to the frame of the electric cranking motor 12 in a manner well known to those skilled in the art.

The electric cranking motor 12 has an armature designated by reference numeral 16 which includes the usual armature winding. This motor has a series field comprised of a pair of parallel connected series field windings 18 and 20 and a shunt field comprised of a pair of shunt field windings 22 and 24 which are connected in series with each other.

The armature shaft of the cranking motor 12 is designated by reference numeral 26. This armature shaft carries a starter drive generally designated by reference numeral 28 that comprises a pinion 30, an over-running clutch 32, a sleeve 34 and a shift collar 36. The shift collar 36 is fixed to the sleeve 34 and the sleeve 34 and the armature shaft 26 have a co-operating helical or spiral splines (not illustrated) which causes the sleeve 34 to rotate slightly when the shift collar 36 and the sleeve are shifted axially with respect to the shaft 26. Such a splined connection is well known to those skilled in the art, one example being the starter drive arrangement disclosed in the U.S. Pat. No. 2,902,125, to House et al.

The sleeve 34 is rigidly connected to the outer clutch shell of the over-running clutch 32 and the pinion 30 is connected to the inner clutch shell of the over-running clutch 32. The over-running clutch may be of the general type disclosed in the abovereferenced patent to House et al. U.S. Pat. No. 2,902,125. The starter drive which includes pinion 30 is adapted to be shifted axially along the armature shaft 26 into mesh with the ring gear 38 of an internal combustion engine 40 in order to crank the engine.

The solenoid 14 has a pull-in coil 42, a hold-in coil 44 and a plunger or armature 46 which is shifted axially when the coils are energized. The plunger 46 operates a movable electrical contactor 48 which is shown fixed to the plunger 46 but electrically insulated therefrom. The contactor 48, at times, engages fixed electrical contacts 50 and 52. The solenoid switch that has been described can be of the type illustrated in the U.S. Pat. No. 4,382,242 to Colvin et al. As shown in that patent the switch has a rod which is engaged by the armature or plunger of the solenoid to thereby operate the switch.

The plunger or armature 46 of the solenoid is connected to a rod or link 54 which in turn is connected to a pivotally mounted shift lever 56 which pivots about a pivot 58. One end of the shift lever is coupled in a conventional manner to the shift collar 36 so that pivotal movement of the shift lever 56 will cause the starter drive 28 and pinion to be shifted axially with respect to the shaft 26. When the solenoid coils are energized the plunger 46 is shifted in a direction to cause the contactor 48 to engage the fixed contacts 50 and 52. This movement of the plunger 46 pivots the shift lever 56 counterclockwise against the force of spring 57 thereby shifting the starter drive 28 to the right in the drawing and in such a direction as to cause the pinion 30 to mesh with the ring gear 38. The linkage connecting the plunger 46 and the pinion 30 is arranged such that the contactor 48 will only engage the fixed contacts 50 and 52 when the pinion 30 is fully meshed with the ring gear 38. Thus, if an end tooth abutment occurs between the ends of the teeth of pinion 30 and the ends of the teeth of ring gear 38 so as to prevent meshing of the pinion 30 with the ring gear 38 the switch contactor 48 will not become engaged with the fixed contacts 50 and 52. In this regard it is noted that parts of the the starter drive 28 cannot move axially relative to each other so that when an end tooth abutment occurs the plunger 46 and the shift lever 56 cannot move and accordingly the contactor 48 does not become engaged with the fixed contacts 50 and 52. In this end tooth abutment condition the energized coils of the solenoid attempt to mesh the pinion with the ring gear and cause the contactor 48 to engage fixed contacts 50 and 52 but such movement is prevented or blocked since the linkage connecting the plunger and the pinion is effectively blocked from movement because of the end tooth abutment. When the coils of the solenoid are deenergized the return spring 57 returns the plunger 46 and pinion to positions illustrated in the drawing. Thus, spring 57 causes the contactor 48 to separate from fixed contacts 50 and 52 and causes the pinion 30 to be pulled out of mesh with ring gear 38.

The system illustrated in the drawing includes a 24 volt direct voltage source which takes the form of two series connected 12 volt batteries 60. The negative side of the batteries is grounded and the positive side of the batteries is connected to the fixed solenoid switch contact 50 by a conductor 62. The other fixed contact 52 of the solenoid switch is connected to one side of the parallel connected field windings 18 and 20 via a conductor 64. The fixed contact 52 is also connected to one side of the pull-in coil 42 of the solenoid 14.

The system illustrated in the drawing has a manually operable start switch 66, one side of which is connected to the positive side of the batteries 60. The start switch is connected to one side of the coil 68 of a starting relay or magnetic switch designated by reference numeral 70. The opposite side of coil 68 is grounded. The relay or magnetic switch 70 includes a movable contact 72 which is normally spring biased out of engagement with a fixed contact 74. The movable contact 72 of magnetic switch 70 is connected to a junction 76 by a conductor 78. The junction 76 is connected to one side of the pull-in coil 42 and one side of the hold-in coil 44. The fixed contact 74 of relay 70 is connected to the positive side of batteries 60 by a conductor 80. One side of the shunt field coils 22 and 24 are connected to one side of the hold-in coil 44 via a conductor 82, the opposite side of the field coils 22 and 24 being grounded.

The operation of the starting system will now be described. Assuming that the operator of a motor vehicle desires to crank the engine, the manually operable switch 66 is closed. The closure of switch 66 energizes the coil 68 of the magnetic switch 70 thereby causing the contact 72 to engage the fixed contact 74. In this condition of operation the shunt field coils 22 and 24 will be energized via a circuit that can be traced from conductor 78 to junction 76, through hold-in coil 44, through conductor 82 and then through the shunt field coils 22 and 24 to ground. The series field coils 18 and 20 and the armature winding of armataure 16 will now be energized via a circuit that can be traced from conductor 78 to junction 76, through pull-in coil 42 to fixed contact 52, through conductor 64, through the parallel connected series field windings 18 and 20 and then through the armature winding of armature 16 to ground. With the pull-in and hold-in coils energized the solenoid plunger 46 is shifted against the force of spring 57 thereby causing the pinion 30 to move toward a meshing condition with the ring gear 38. If it is assumed that the pinion 30 does not mesh with the ring gear 38 due to an end tooth abutment condition the contactor 48 will be blocked or prevented from engaging the fixed contacts 50 and 52. In this condition of operation, however, the electric cranking motor will develop a small indexing torque of approximately 3 lb.-ft. This torque will cause a slow rotation of shaft 26 and pinion 30 so that eventually the pinion will be rotated to a position to mesh with the ring gear 38. This small torque has been developed because during this condition or mode of operation the shunt field coils 22 and 24 are energized through hold-in coil 44 and the armature winding of armature 16 is energized through the series field coils 18 and 20 and the pull-in coil 42. The flux generated by the shunt field coils 22 and 24 aids the flux developed by the series field coils 18 and 20 in providing the small indexing torque. Putting it another way, the flux generated by the series and shunt field coils aid each other in causing the motor armature 26 to rotate in a given direction.

When the pinion 30 is slowly rotated against the end of the teeth of ring gear 38 it will be indexed to a position where it will mesh with the ring gear 38. The force developed by the coils of the solenoid will now shift the pinion 30 into full mesh with the ring gear and the contactor 48 will now engage fixed contacts 50 and 52. The motor is now energized to develop full cranking power as a compound motor. In this full power mode of operation the series field coils 18 and 20 and the armature 16 are connected directly across the batteries 60 via a circuit that can be traced from conductor 62, through bridged fixed contacts 50 and 52, through conductor 64, through the parallel connected field coils 18 and 20 and then through the armature winding of armature 16 to ground. The pull-in coil 42 is short circuited when contactor 48 engages fixed contacts 50 and 52 but the solenoid plunger 46 remains pulled in since hold-in coil 44 is maintained in an energized condition. In this full power mode of operation the shunt field coils 22 and 24 are energized through the hold-in coil 44.

In a 24 volt system, the resistance of hold-in coil 44 may have a range of approximately 0.4 to 0.45 ohms. The resistance value of the pull-in coil 42 may have a range of approximately 0.357 to 0.425 ohms and the resistance of each shunt field coil 22 and 24 may be approximately 0.25 ohms or a total shunt coil series resistance of 0.5 ohms. The resistance of each series field winding (18 and 20) may be approximately 0.00403 ohms and the resistance of the armature winding of armature 16 can be approximately 0.00311 ohms. It can be seen from these resistance values that the amount of current supplied to the series field windings and the motor armature is substantially increased when the contactor 48 engages the fixed contacts 50 and 52 to place the motor in its full power mode. On the other hand, the resistance values are such that when the contactor 48 is not engaging fixed contacts 50 and 52 only a small indexing torque is developed since current to the shunt field windings 22 and 24 is limited by the resistance of the hold-in coil 44 and current to the series field windings 18 and 20 is limited by the resistance of the pull-in coil 42.

When the operator of the vehicle desires to terminate cranking the manually operable switch 66 is shifted to an open condition thereby causing contactor 72 to shift out of engagement with contact 74 to thereby deenergize the solenoid coils. The spring 57 now moves the plunger 46 to a position in which the contactor 48 is disengaged from contacts 50 and 52 and moves the shift lever 56 to a position in which the pinion 30 is disengaged from the ring gear 38.

When the solenoid coils are energized and no end tooth abutment occurs the pinion 30 is shifted into mesh with the ring gear 38 and the motor cranks the engine as a compound motor.

The cranking motor may be a four pole compound motor having the series field coils 18 and 20 and the shunt field coils 22 and 24.

The splined connection between motor shaft 26 and sleeve 34 causes the pinion 30 to be rotated slightly each time the starter drive 28 is shifted relative to shaft 26 to facilitate meshing of pinion 30 with ring gear 38. This splined connection also serves to rotatably drive the pinion 30 from shaft 26.

As previously mentioned, the contactor 48 is prevented or blocked from engaging fixed contacts 50 and 52 when end tooth abutment occurs between pinion 30 and ring gear 38. This is due to the fact that the parts of the starter drive 28 do not move axially relative to each other when the starter drive is in effect compressed between the end of shift lever 56 and ring gear 38 and consequently shift lever 56 and plunger 46 are blocked from movement. In this regard, and as previously mentioned, the collar 36 is fixed to sleeve 34 so that it cannot move axially relative thereto. The motor energizing arrangement of this invention that provides the small indexing torque when end tooth abutment occurs can be used with any type apparatus that is capable of preventing the contactor 48 from engaging fixed contacts 50 and 52 when end tooth abutment occurs.

The embodiments of the invention in which an exclusive property or privilege is claimed are defined as follows:

1. An electric starting system for cranking an engine comprising, a source of direct voltage, an electric cranking motor having an armature, a series field winding and a shunt field winding, a shaft driven by said armature carrying a pinion that is adapted to be meshed with the ring gear of an engine to be cranked, a solenoid having a pull-in coil, a hold-in coil and a shiftable plunger, means connecting said plunger and pinion such that shiftable movement of said plunger causes said pinion to shift, a start switch, means connecting one side of said start switch to a first side of said voltage source, a first circuit connected between the opposite side of said start switch and a second side of said voltage source comprising in a series connection said solenoid hold-in coil and said shunt field winding, and a second circuit connected between said opposite side of said start switch and said second side of said voltage source, said second circuit connected in parallel with said first circuit and comprising in a series connection, said solenoid pull-in coil, said series field and the armature winding of said armature.

2. An electric starting system for cranking an engine comprising, a source of direct voltage, an electric cranking motor having an armature, a series field winding and a shunt field winding, a shaft driven by said armature, a pinion slidably supported on and driven by said armature shaft that is adapted to be meshed with the ring gear of an engine to be cranked, a solenoid having a pull-in coil, a hold-in coil and a shiftable plunger, means connecting said plunger and pinion such that shiftable movement of said plunger causes said pinion to shift, a start switch, means operative when said start switch is closed and said pinion is in end tooth abutment with said ring gear to energize said cranking motor from said voltage source in a first mode of energization wherein said solenoid hold-in coil and said shunt field winding are connected in series and across said voltage source and said solenoid pull-in coil, series field winding and the armature winding of said armature are connected in series and across said voltage source, said motor when operating in said first mode of energization developing a small indexing torque for rotating said pinion to a position where it can mesh with said ring gear, and means operative when said pinion is meshed with said ring gear for energizing said motor in a second mode of energization wherein said hold-in coil and shunt field winding are series connected across said voltage source, said series field winding and armatue winding and series connected across said voltage source and said pull-in coil is short circuited, said motor when operating in said second mode of energization developing full cranking torque as a compound motor.

3. An electric starting system for cranking an engine comprising, a source of direct voltage, an electric cranking motor having an armature, a series field winding and a shunt field winding, a shaft driven by said armature slidably supporting and rotatably driving a pinion that is adapted to be meshed with the ring gear of an engine to be cranked, a solenoid having a pull-in coil, a hold-in coil and a shiftable plunger, means connecting said plunger and pinion such that shiftable movement of said plunger causes said pinion to shift, solenoid switch means which is operated to a closed condition by said plunger when said pinion is fully meshed with said ring gear, a start switch, means connecting one side of said start switch to a first side of said voltage source, a first circuit connected between the opposite side of said start switch and a second side of said voltage source comprising in a series connection said solenoid hold-in coil and said shunt field winding, and a second circuit connected between said opposite side of said start switch and said second side of said voltage source, said second circuit connected in parallel with said first circuit and comprising in a series connection, said solenoid pull-in coil, said series field and the armature winding of said armature, said first and second circuits energizing said field windings and armature winding such that the motor develops a small torque to rotate the armature shaft and pinion slowly when said solenoid switch means is in an open condition, said solenoid switch means when closed connecting the series field winding and armature winding of said motor directly across said voltage source and short circuiting said pull-in coil whereby said motor develops full torque output to crank the engine.

4. An electric starting system for cranking an engine comprising, a source of direct voltage, an electric cranking motor having an armature, a series field winding and a shunt field winding, a shaft driven by said armature, a pinion slidably supported by said shaft and rotatably driven thereby that is adapted to be meshed with the ring gear of an engine to be cranked, a solenoid having a pull-in coil, a hold-in coil and a shiftable plunger, means connecting said plunger and pinion such that shiftable movement of said plunger causes said pinion to shift, a solenoid switch operated by said plunger that is actuated to a closed condition when said pinion is fully meshed with said ring gear and which is in an open condition when end tooth abutment occurs between said pinion and ring gear, a start switch, means connecting one side of said start switch to a first side of said voltage source, a first circuit connected between the opposite side of said start switch and a second side of said voltage source comprising in a series connection said solenoid hold-in coil and said shunt field winding, and a second circuit connected between said opposite side of said start switch and said second side of said voltage source, said second circuit connected in parallel with said first circuit and comprising in a series connection, said solenoid pull-in coil, said series field and the armature winding of said armature, said first and second circuits energizing said field windings and armature winding such that the motor develops a small indexing torque to rotate the armature shaft and pinion slowly when end tooth abutment occurs and said solenoid switch is open, said solenoid coils causing said pinion to mesh with said ring gear after said pinion has been rotated to a meshing position, said solenoid switch closing when said pinion meshes with said ring gear and said solenoid switch in a closed condition connecting the series field winding and armature winding of said motor directly across said voltage source and short circuiting said pull-in coil whereby said motor develops full torque output to crank the engine.

* * * * *